J. SCHAUB.
ARTIFICIAL FUEL MACHINE.
APPLICATION FILED JULY 17, 1917.

1,314,984.

Patented Sept. 2, 1919.
9 SHEETS—SHEET 1.

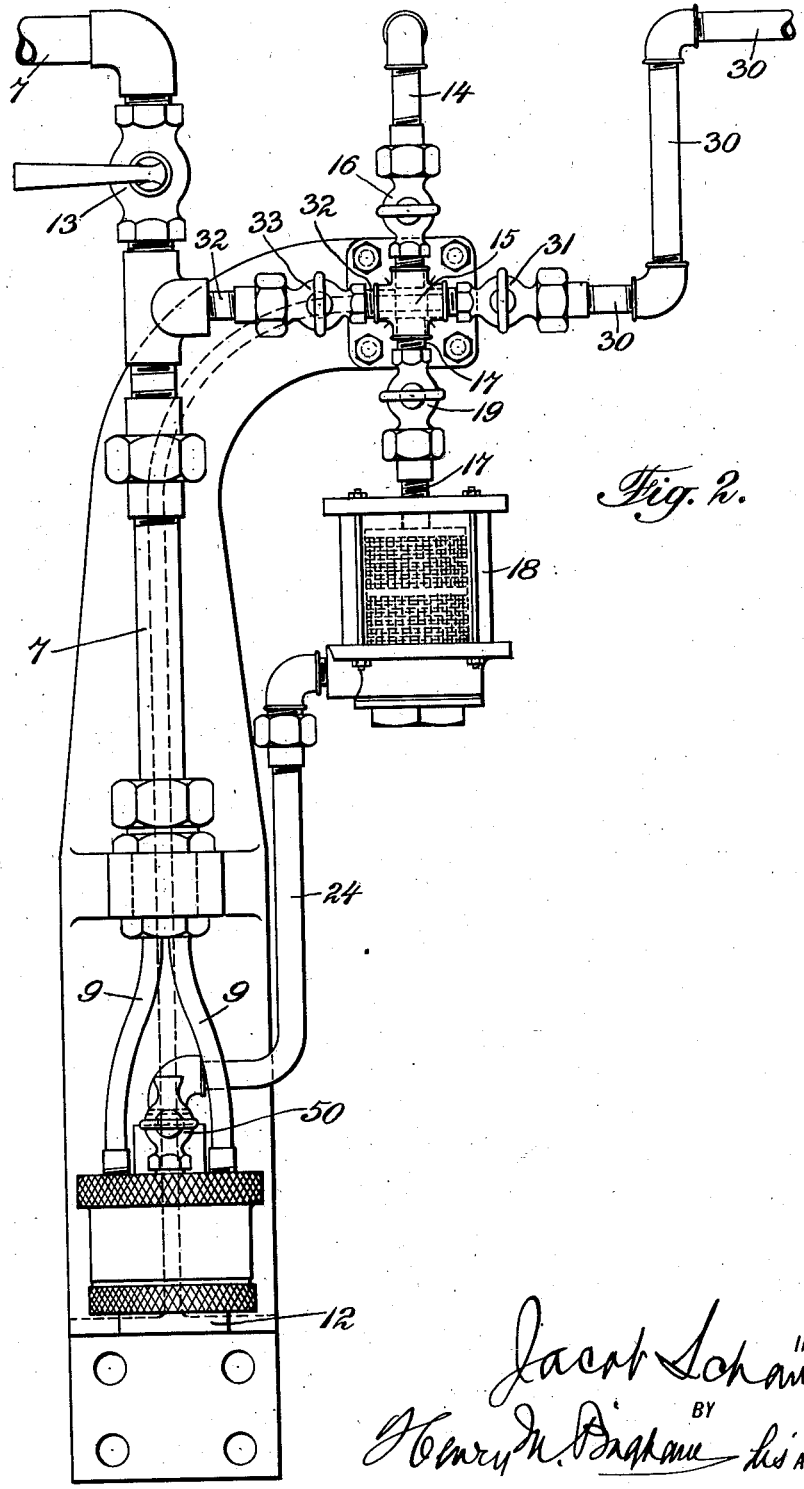

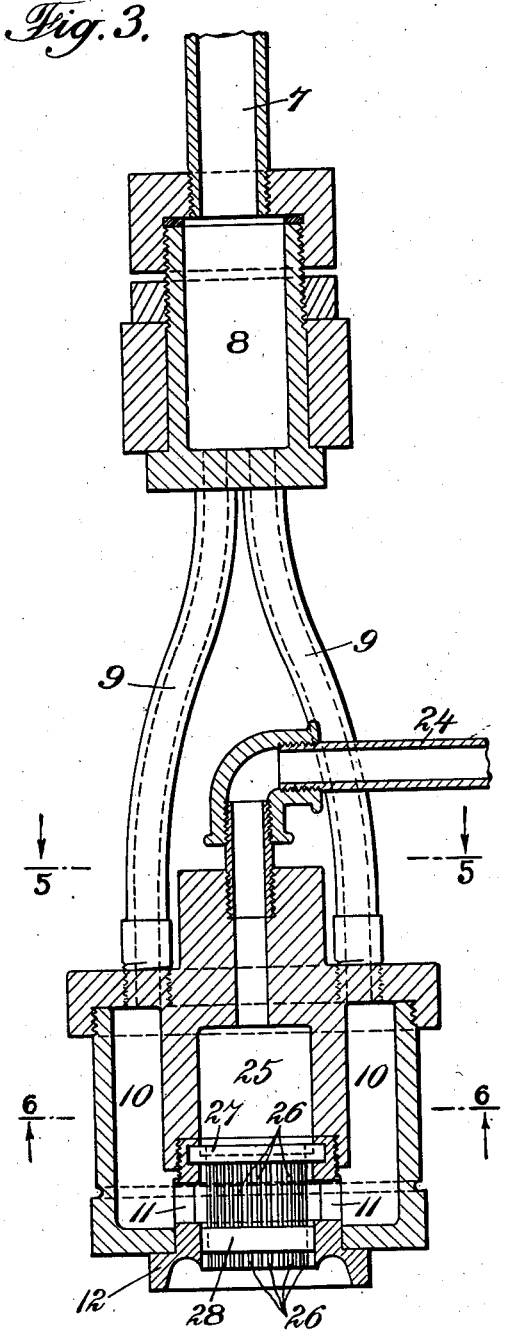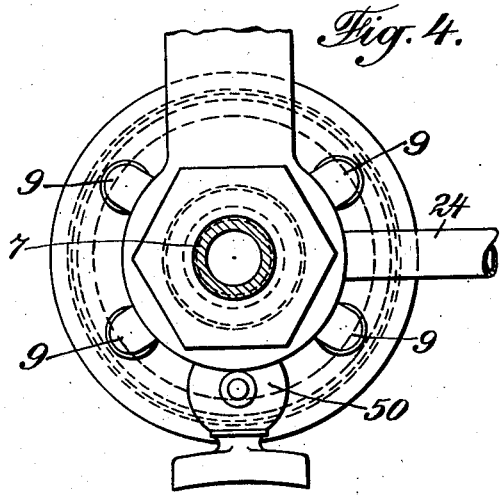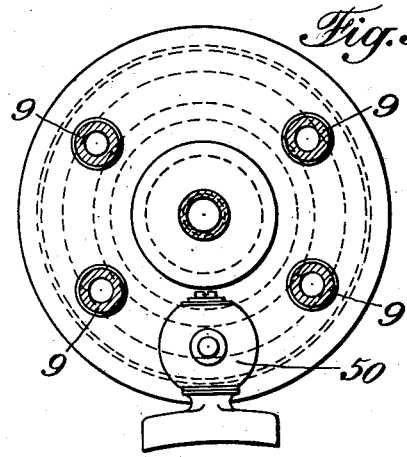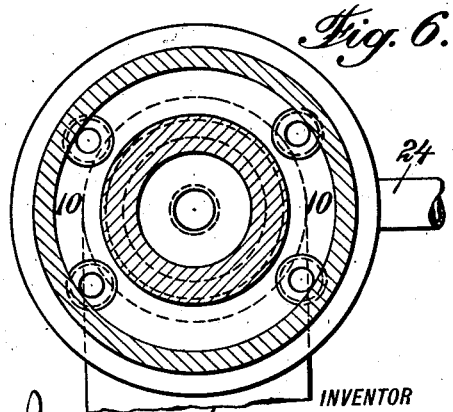

J. SCHAUB.
ARTIFICIAL FUEL MACHINE.
APPLICATION FILED JULY 17, 1917.

1,314,984.

Patented Sept. 2, 1919.
9 SHEETS—SHEET 4.

INVENTOR
Jacob Schaub
BY
Henry M. Brinshaw his ATTORNEY

J. SCHAUB.
ARTIFICIAL FUEL MACHINE.
APPLICATION FILED JULY 17, 1917.

1,314,984.

Patented Sept. 2, 1919.
9 SHEETS—SHEET 5.

INVENTOR
Jacob Schaub
BY
Henry M. Bingham
ATTORNEY

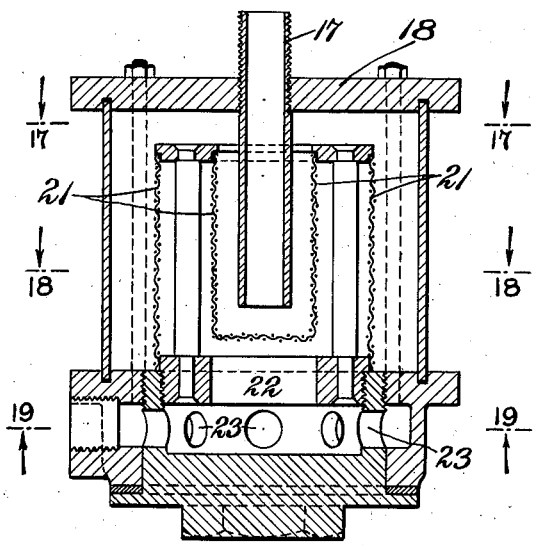
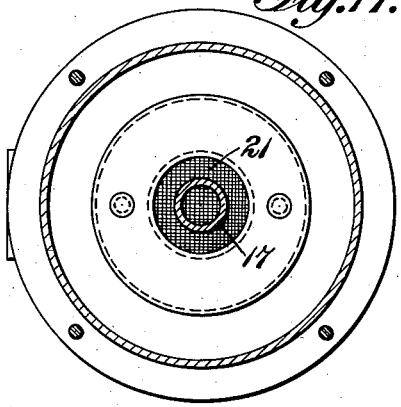
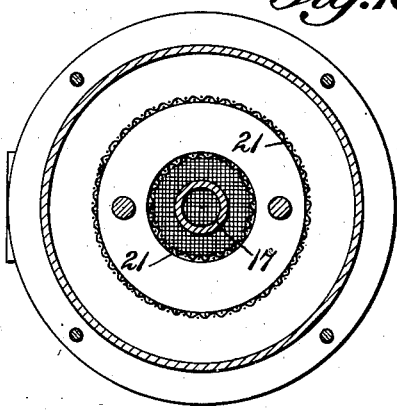
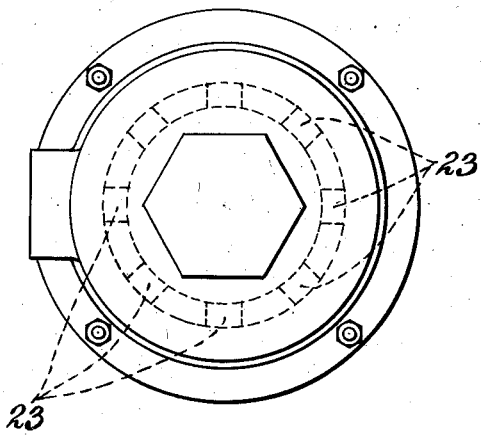
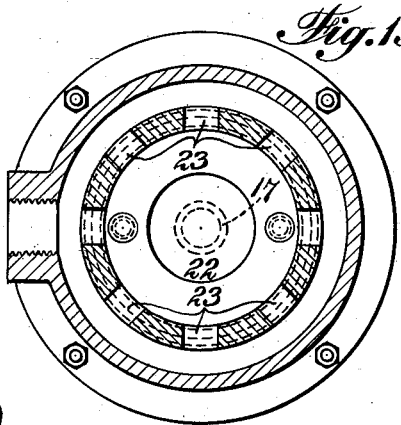

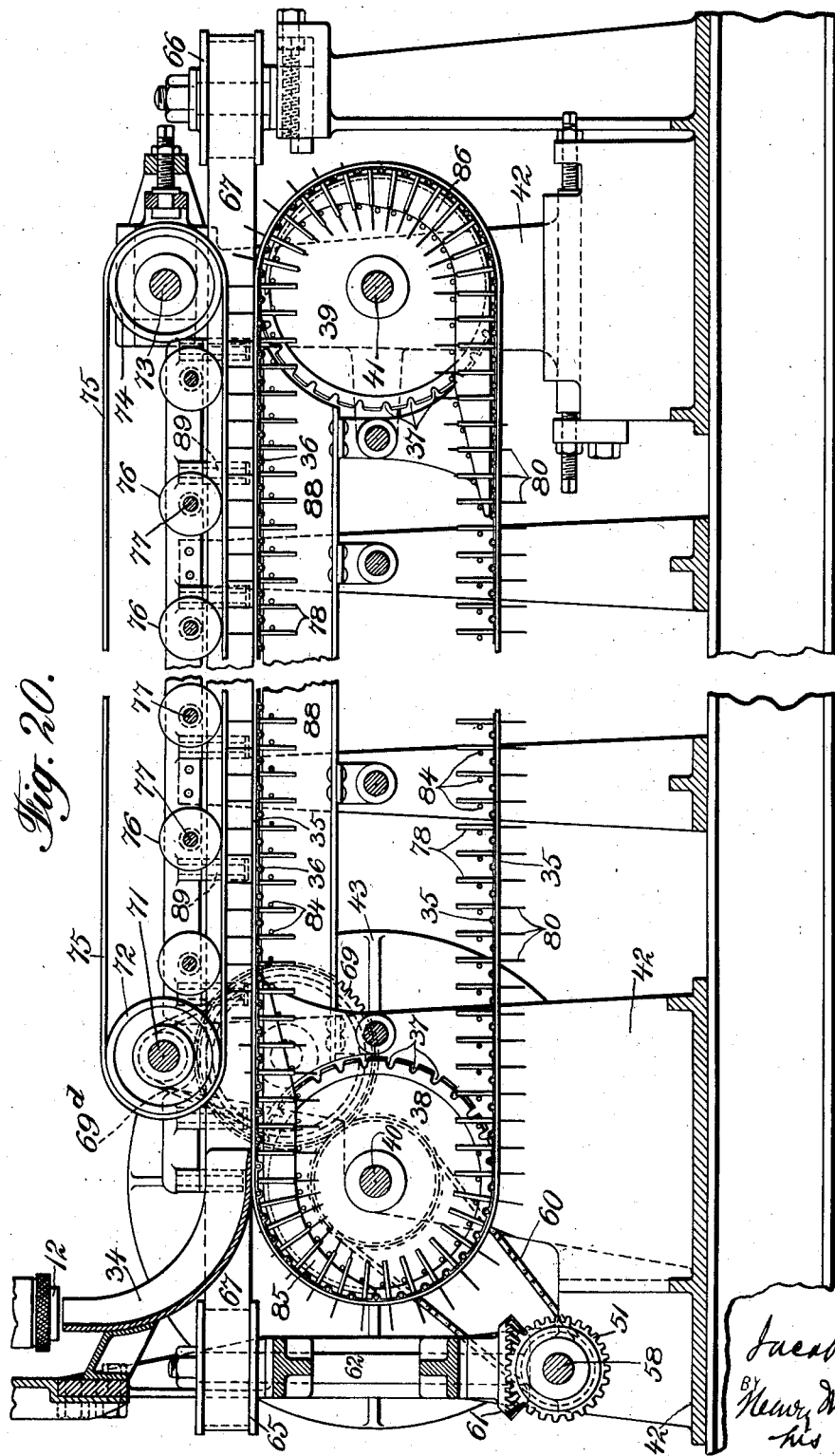

J. SCHAUB.
ARTIFICIAL FUEL MACHINE.
APPLICATION FILED JULY 17, 1917.

1,314,984.

Patented Sept. 2, 1919.
9 SHEETS—SHEET 8.

Jacob Schaub INVENTOR

BY Henry D. Braham his ATTORNEY

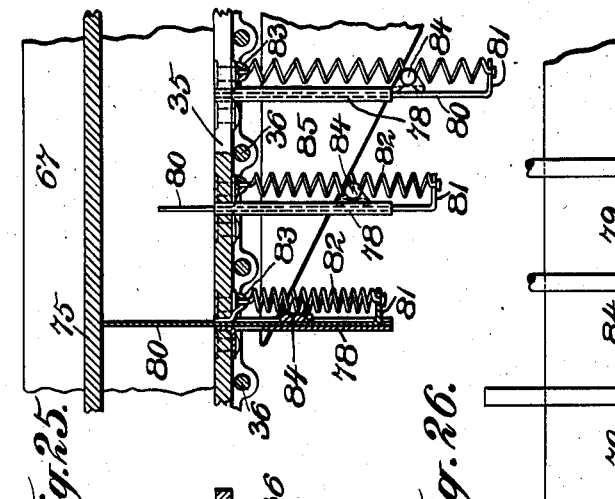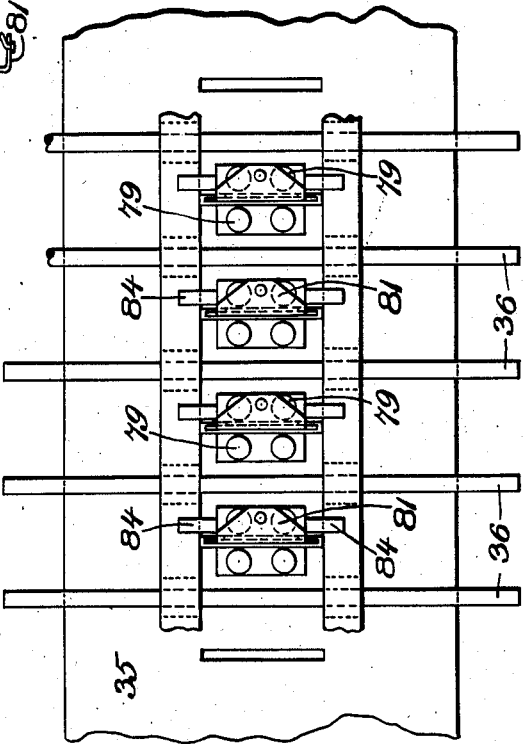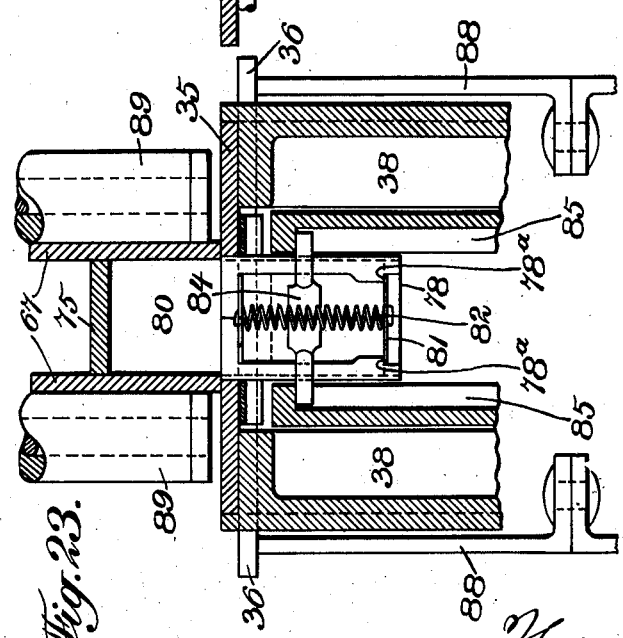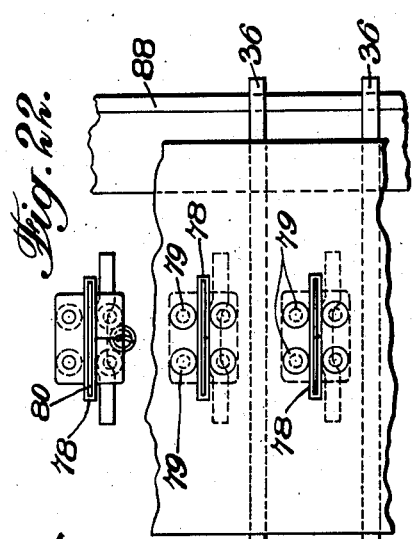

UNITED STATES PATENT OFFICE.

JACOB SCHAUB, OF NEWARK, NEW JERSEY, ASSIGNOR TO AMERICAN LINSEED COMPANY, A CORPORATION OF NEW JERSEY.

ARTIFICIAL-FUEL MACHINE.

1,314,984. Specification of Letters Patent. Patented Sept. 2, 1919.

Application filed July 17, 1917. Serial No. 181,034.

*To all whom it may concern:*

Be it known that I, JACOB SCHAUB, a citizen of the United States, and a resident of Newark, in the county of Essex and State of New Jersey, have invented certain new and useful Improvements in Artificial-Fuel Machines, of which the following is a specification.

The objects of my invention are to produce an enveloping apparatus by which enveloping material in a syrupy or plastic condition may be formed into a tubulous body and the liquid to be enveloped introduced into the tubules in the enveloping material and retained therein, by which the product may be molded into the desired shape, by which the ends of the tubules may be collapsed so as to seal the tubules, and by which the tubules are retained in the collapsed state until the enveloping material has solidified. These and the other objects of my invention will more fully appear in the following specification and claims.

My enveloping apparatus is well adapted to the manufacture of candies and many other articles, but the type illustrated in the accompanying drawings is especially adapted for the manufacture of artificial fuel.

When artificial fuel is to be manufactured, I prefer to use as my enveloping material a colloid made by dissolving approximately four parts of cellulose-pentanitrate in forty-six parts of methyl alcohol, to which approximately twelve parts of commercial ethyl alcohol has been added to bring the colloid to the desired degree of viscosity, and in an envelop of such material I inclose ethyl alcohol, which causes the envelop to quickly solidify into a firm jelly which with its liquid content may be readily ignited, does not fuse while burning, gives out a high heat and leaves little ash or residue.

Figure 1:
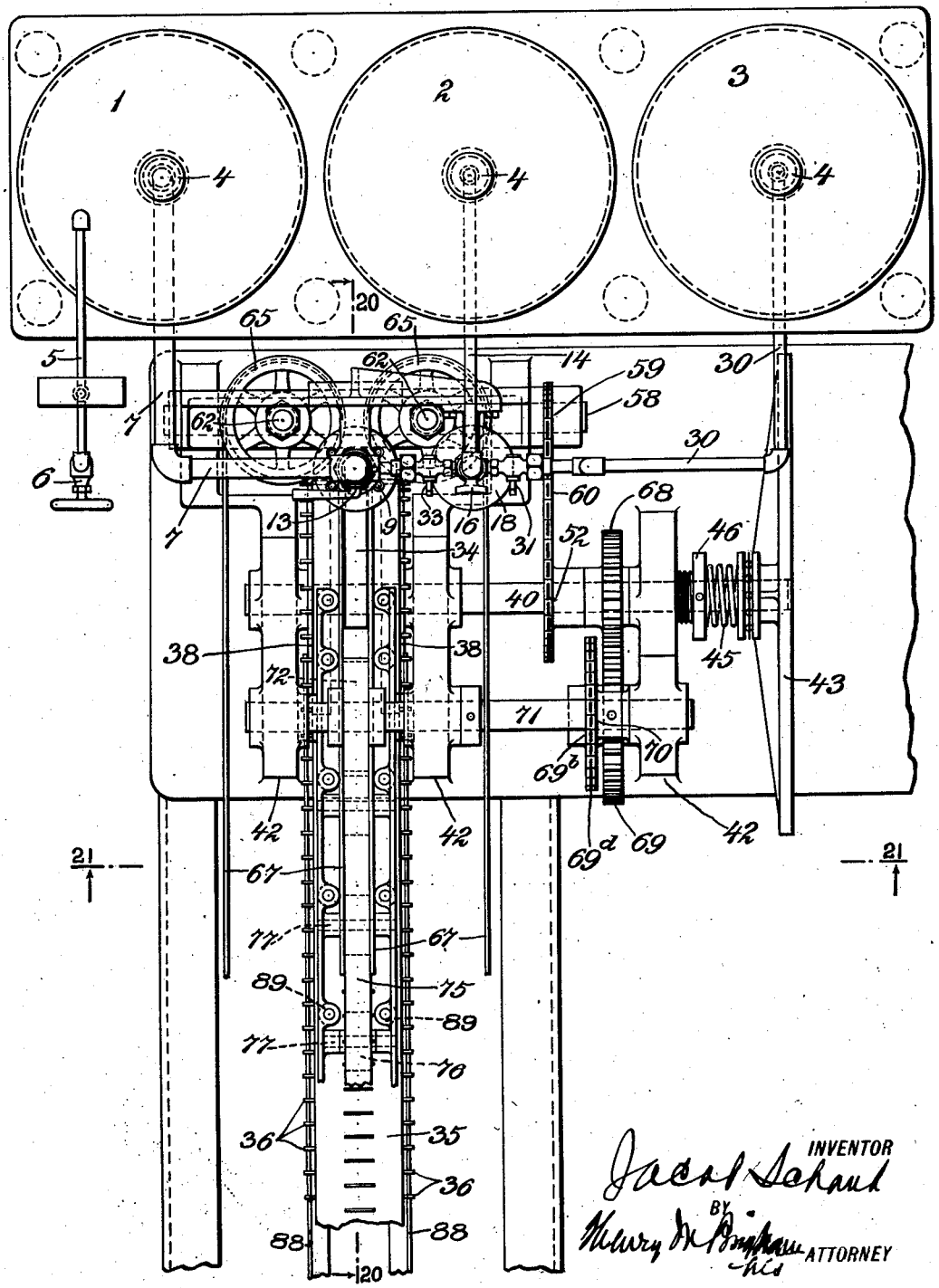
Figure 7:
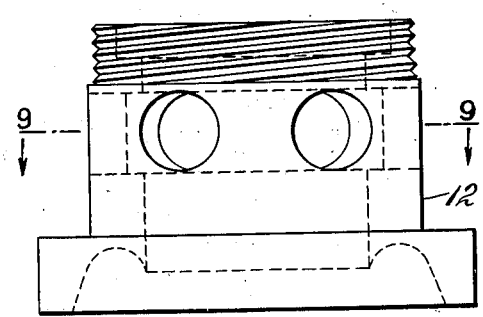
Figure 10:
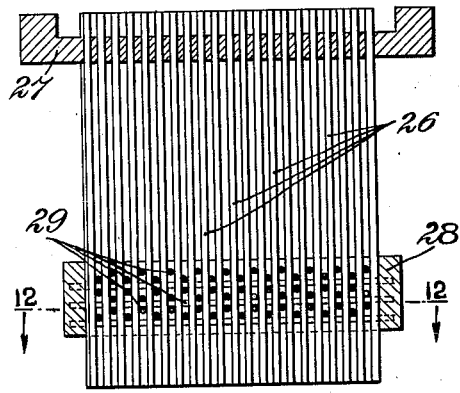
Figure 8:
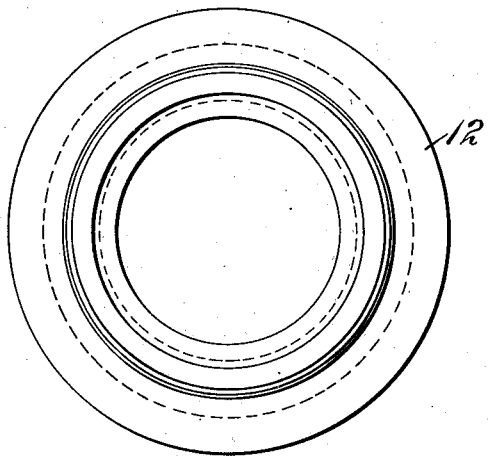
Figure 11:
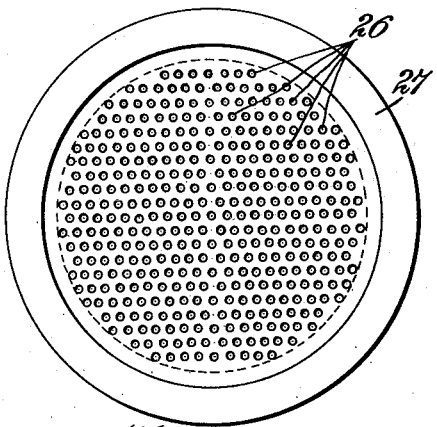
Figure 9:
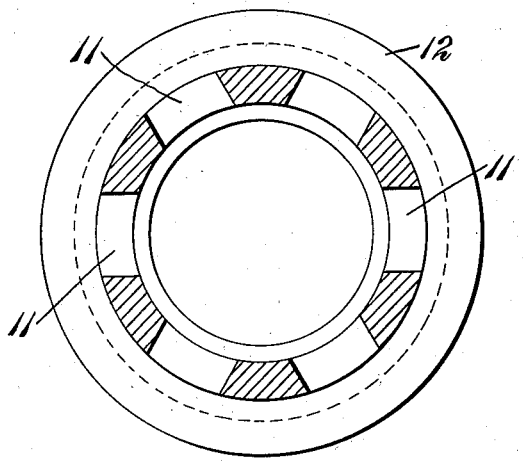
Figure 12:
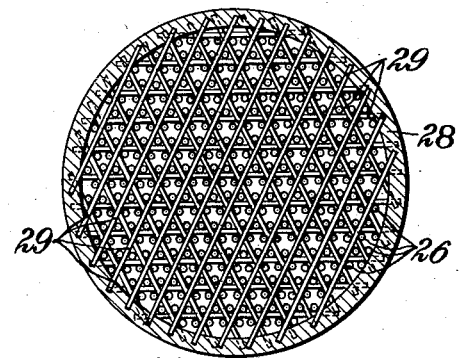
Figure 13:
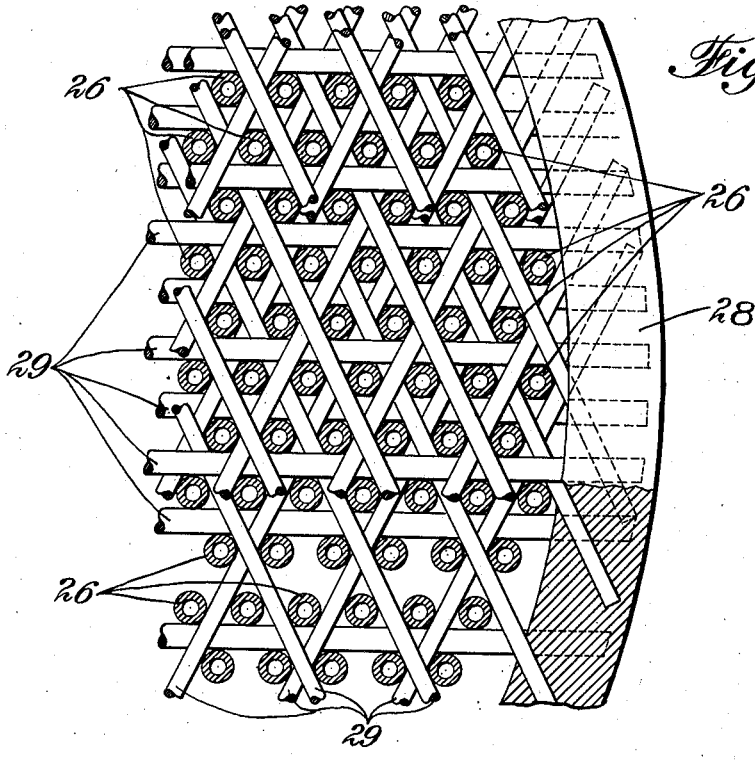
Figure 14:
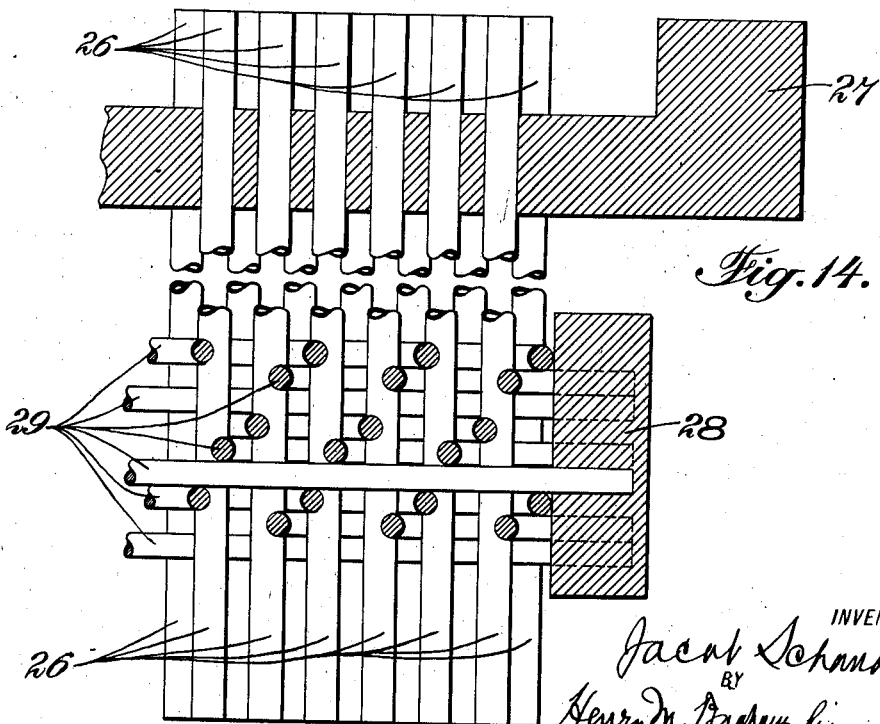
Figure 21:
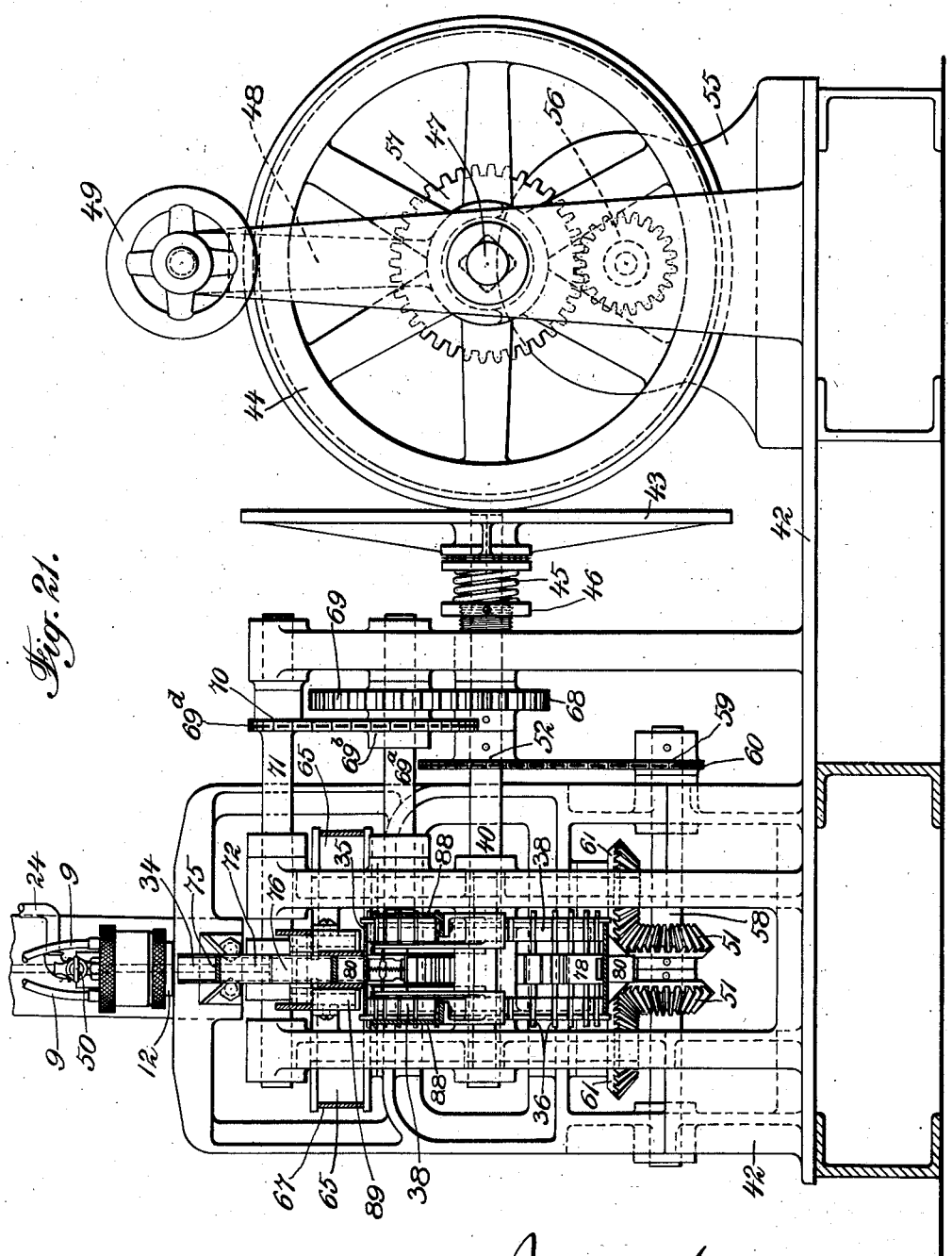

Figure 1 of the drawings is a plan view of my apparatus. Fig. 2 is an elevation of the forming die and the pipes for feeding colloid and ethyl alcohol thereto and methyl alcohol from the tank 3. Fig. 3 is a sectional elevation of the forming die and apparatus for feeding colloid and ethyl alcohol thereto. Fig. 4 is a plan view of the forming die. Fig. 5 is a sectional view on the line 5—5 of Fig. 3, and Fig. 6 is a sectional view on the line 6—6 of Fig. 3. Fig. 7 is an elevation of the casing of the forming die. Fig. 8 is a bottom plan view of the die looking upward. Fig. 9 is a sectional view on the line 9—9 of Fig. 7. Fig. 10 is a detail elevation of the die core on an enlarged scale. Fig. 11 is a plan view of the die core and Fig. 12 is a sectional view on the line 12—12 of Fig. 10. Fig. 13 is a partial sectional view of the die core of Fig. 10, showing the method of securing the tubes in the core. Fig. 14 is a vertical detailed section of the core, also showing the method of mounting the tubes in the core. Fig. 15 is a sectional elevation of the strainer through which the ethyl alcohol is passed. Fig. 16 is a plan view of the strainer looking upward. Fig. 17 is a sectional view on the line 17—17 of Fig. 15. Fig. 18 is a sectional view on the line 18—18 of Fig. 15. Fig. 19 is a sectional view on the line 19—19 of Fig. 15. Fig. 20 is a sectional elevation on the line 20—20 of Fig. 1. Fig. 21 is a sectional view on the line 21—21 of Fig. 1. Fig. 22 is a plan view of a portion of the conveyer belt which forms the bottom of the mold. Fig. 23 is a cross-section of the conveyer belt and mold. Fig. 24 is a detailed section of the conveyer belt showing a cutting blade and housing viewed from the rear. Fig. 25 is a side view, partly in section, showing the cutting blades in different positions, and a stationary cam by which they are operated. Fig. 26 is a bottom plan view of the conveyer belt.

Similar numerals of reference refer to similar parts throughout the accompanying drawings.

The tanks 1, 2 and 3 are mounted at such an elevation that the ethyl alcohol contained in the tank 2 and the methyl alcohol contained in the tank 3 will flow by gravity to the apparatus, under a suitable head, and all of the tanks are provided with a cap 4, which may be removed when the tanks are to be filled, and then replaced. The tank 1 is designed to hold a supply of the colloid above described. Compressed air may be introduced into this tank from any suitable source through the pipe 5, which is provided with a cut-off cock 6, by which the supply of compressed air may be cut off or controlled. A pipe 7 leads from the bottom of the tank 1 to the chamber 8, from whence pipes 9 lead to a chamber 10 which is in communication, through the ports 11, with the forming die 12. 50 is a petcock which may be opened to permit the air in the chamber 10 to be forced out when the chamber is being filled with colloid. The pipe 7 is provided with a cut-off cock 13. A pipe 14 leads from the bottom of the tank 2 to a union 15, and is provided with a cut-off cock 16. Secured to the union 15 is a pipe 17, which leads to the strainer 18, where any impurities are removed by the wire gauze screens 21, 21. The pipe 17 is provided with a cut-off cock 19. The ethyl alcohol then passes through the ports 22 and 23, through the pipe 24, to the chamber 25, and thence out through the minute tubular members or pipes 26, which are secured in the disk 27, which is mounted in a suitable chamber in the die 12. The minute pipes 26 are maintained in properly spaced relation to each other by the ring 28, and the rods 29, the ring 28 fitting accurately into the bore of the die 12. A pipe 30, provided with a cut-off cock 31, leads from the bottom of the tank 3 to the union 15, and a pipe 32, provided with a cut-off cock 33, leads from the union 15 to the pipe 7. Mounted on suitable framework beneath the discharge orifice of the die 12 is a trough 34, which catches the material discharged from the die 12 and conveys it to the molding apparatus, which consists of a bottom conveyer belt 35, provided with rods 36, which are mounted on the under side of the conveyer belt 35 and fall into the recesses 37 in the active pulley 38 and the idle pulley 39. The pulley 38 is mounted on a shaft 40 provided with suitable bearings in the frame 42. The pulley 39 is mounted on a shaft 41, supported in the frame 42. Mounted on the shaft 40 is a friction disk 43, which is forced against a pulley 44 by the springs 45, the tension of which may be adjusted by the nut 46, the end of the shaft 40 on which the disk 43 is mounted being square, so that the shaft will be compelled to rotate with the disk 43, and yet permit the disk 43 to move longitudinally on the shaft 40 so as to maintain contact with the pulley 44, which is mounted against rotation on a square shaft 47, upon which it may be moved longitudinally by means of the shifting device 48 operated by the hand wheel 49.

An electric motor 55, mounted on the frame 42, has a spur gear 56, mounted on its shaft, which meshes with a spur gear 57 mounted against rotation on the shaft 47. Mounted on the shaft 40 against rotation is a sprocket 52. On a shaft 58, mounted in suitable bearings in the frame 42, is mounted a sprocket 59, and mounted on the sprockets 52 and 59 is a driving chain 60. Mounted on the shaft 58 are beveled gears 51, 51, which intermesh with beveled gears 61, 61, mounted against rotation on shafts 62, 62, which are provided with suitable bearings in the frame 42. Mounted against rotation on the shafts 62 are pulleys 65. Running on the pulleys 65 and idle pulleys 66 are belts 67, the lower edges of which lie on the upper surface of the conveyer belt 35 and form the side walls of the mold, the belts 67 traveling at the same rate as the conveyer belt 35, which forms the bottom of the mold. Mounted against rotation on the shaft 40 is a spur gear 68 which meshes with a spur gear 69, which is mounted against rotation on the shaft 69$^a$. A sprocket 70 is mounted against rotation on a shaft 71, which is mounted in suitable bearings in the frame. A sprocket 69$^b$ is mounted against rotation on the shaft 69$^a$. Sprockets 69$^b$ and 70 carry a driving chain 69$^d$. Mounted on the shaft 71 is a pulley 72. On a shaft 73 supported in the frame 42, is an idle pulley 74, and mounted on the pulleys 72 and 74 is a belt 75, which also runs at the same speed as the conveyer belt 35 and forms the upper wall of the mold. Idle pulleys 76, mounted on shafts 77, suitably mounted in the frame 42, prevent the belt 75 from lifting away from the material in the mold.

Mounted in suitable housings 78, which are secured to the conveyer belt 35 by rivets 79, are rectangular blades 80, the lower portion of each of which is bent at right angles to form a lip 81. To this lip 81 is secured one end of a spring 82, the other end of which is secured to an eye 83 formed on the housing 78. The spring 82 normally maintains the blades 80 with the lips 81 against stops 78$^a$ on the housings so that the blades protrude through the conveyer belt 35 in the position of the blade shown in Fig. 23. Arms 84 are secured on the blades 80 by spot welding or in any other suitable manner and project beyond the sides of the housings 78, one wall of which is partially cut away, as shown in Fig. 23, to permit this construction. Secured to the frame 42, in proximity to the pulley 38, are stationary guide cams 85 which engage the ends of the arms 84 and force down the cutting blades 80 as the conveyer belt 35 passes over the pulley 38 and the material discharged from the trough 34 passes into the mold, while the cutting blades 80 are maintained by the stationary guide cams 85 in the depressed position with their upper edges flush with the upper surface of the conveyer belt 35 until the material in the mold has passed under the belt 75, when they are gradually permitted to rise until their upper edges press against the belt 75, thus cutting the material in the mold into suitable cubes. The cutting blades 80 are maintained in contact with the belt 75 until they have passed from between the belts 67, 67, and beyond the belt 75, when they are again fully depressed by guides 86, in order that the cubes may be permitted to fall from the conveyer belt 35.

In order to prevent the sagging of the conveyer belt 35 between the pulleys 38 and 39, I have provided supporting guides 88, secured to the frame 42, upon which the ends of the rods 36 ride. Rotatably supported on the frame 42, so as to bear against the outside face of the side belts 67, are rollers 89, so spaced as to prevent the spreading of the belts 67, 67, which form the side walls of the mold.

The operation of my apparatus is as follows:—

Colloid of the desired viscosity is introduced into tank 1. The tank 2 is filled with ethyl alcohol, and the tank 3 with methyl alcohol, the cocks 13, 16, 19, 31 and 33 being closed. Cock 13 is then opened, the electric current is switched on to the motor 55, and the cock 6 is opened. When the colloid begins to flow through the die, the cocks 16 and 19 are opened, permitting the ethyl alcohol to flow and be siphoned from the pipes 26 into the tubules which they form in the colloid. The ethyl alcohol introduced into the tubules immediately begins to solidify the walls of the tubules. The speed of the pulley 43 is then regulated through the hand-wheel 49 so that the flow of the material from the die will completely fill the mold.

As the material in the mold passes under the belt 75 the cutting blades 80 are permitted by the stationary guide cams 85 to rise and cut the material into cubes, at the same time collapsing the ends of the tubules. The material is then carried by the conveyer belt 35 and the cutting blades 80 from under the belt 75 and from between the side belts 67, when the blades 80 are again depressed by the stationary guide cams 86 and the cubes are permitted to fall from the conveyer belt 35 and are collected in any suitable receptacle. The cutting blades not only sever the material into cubes, but collapse the ends of the tubules in the cubes so that the tubules are practically sealed and there is no tendency of the liquid ethyl alcohol to flow therefrom. The mass is of a viscous, elastic nature of a jelly like character, when the blades enter it, and the material is compressed by the blades to close the ends of the tubules, and as the blades remain in the material for a period the mass assumes a permanent set so that when the cubes pass from the belt the tubules of the cubes are permanently closed at their ends. The cock 6 is so regulated that when the cutting blades 80 are depressed and the cubes discharged from the mold the enveloping material will have so far solidified that the cubes will maintain their shape and the collapsed ends of the tubules will not open. If preferred, the cubes may then be dipped in a suitable colloid which will form a sealing envelop. The rapidity with which the colloid is fed to the die may be regulated by the cock 6, which regulates the pressure in the tank 1, which acts to force the colloid therefrom. The conveyer belt 35 is of such length that the colloid will be firmly set before the cubes are discharged therefrom. The colloid, into the tubules of which the ethyl alcohol is fed through the pipes 26, solidifies very rapidly, due to the fact that the walls of the tubules are comparatively thin. Owing to the capillary dimensions of the tubules there is no tendency of the ethyl alcohol to flow from the tubules while the cubes are burning, nor is there any tendency of the product to liquefy during combustion.

When all of the colloid has been fed from the tank 1, or when the desired amount of fuel has been manufactured, it is necessary to remove the colloid from the die, and preferably this should be done before it solidifies. This is accomplished by closing the cocks 13, 16 and 19 and opening the cocks 31 and 33, which permits methyl alcohol to flow by gravity from the tank 3 and re-dissolve and wash out any colloid which may have collected in the pipe 32, the pipe 7, the piping, the chamber 10, the ports 11 and in the die 12. The cock 33 may then be closed and the cock 19 opened so as to remove any colloid which may have collected in the chamber 25 or the pipes 26. When the washing has been completed the cocks 31 and 33 should be closed.

In this application I do not claim an artificial fuel nor the method of making the same as they are the subject of my application resulting in Letters Patent No. 1,262,267 granted April 9, 1918.

I claim:—

1. An apparatus for producing self-sustaining tubulous masses from plastic material, comprising a chamber, a plurality of tubular members in spaced relation to each other, positioned axially in said chamber and extending substantially therethrough for the flow of said material lengthwise along said members, an inlet aperture for admitting plastic material to said chamber externally of said tubular members and means for admitting liquid directly into said tubular members at one end thereof and for permitting the substantially unobstructed escape of said liquid into said material surrounding and in contact with the opposite open ends of said tubular members, and means to cut off lengths of said charged material and close the tubules therein.

2. An apparatus for producing tubulous masses, in which material in plastic form is forced through a passage, around the exterior surface of a plurality of comparatively small, substantially parallel longitudinally extending members located in spaced relation to each other within said passage, said material filling the space between said members during its movement through the passage and being rendered tubulous by said members, and means to cut off lengths of said charged material and close the tubules therein.

3. An apparatus for producing self-sustaining tubulous masses from plastic material, comprising a chamber, a plurality of tubular members, in spaced relation to each other, positioned in said chamber and extending substantially therethrough, said chamber being substantially closed at one end and open at the other and having an inlet for material to be converted into tubulous masses, said members at their delivery ends terminating substantially at the delivery end of said chamber, and means to force fluid through the delivery ends of said members into the passing plastic material.

4. An apparatus for producing self-sustaining tubulous masses from plastic material, comprising a chamber, a plurality of tubular members, in spaced relation to each other, positioned in said chamber and extending substantially therethrough, said tubular members being supported at one end by a terminal disk which serves to close one end of said chamber and the opposite ends of said tubular members being substantially out of contact with each other, whereby the plastic mass issuing from said chamber is not substantially disrupted and said chamber being substantially closed at one end and open at the other and having an inlet below said disk for material to be converted into tubulous masses, and means to cut off lengths of said charged material and close the tubules therein.

5. An apparatus for producing self-sustaining tubulous masses from plastic material, comprising a chamber, a plurality of tubular members, in spaced relation to each other, positioned in said chamber and extending substantially therethrough, said chamber being substantially closed at one end and open at the other and having an inlet at one side of said members for material to be converted into tubulous masses, means to force fluid through said members into the tubules formed in said material by said members, and means for dividing the plastic mass issuing from said forming chamber into small unit masses and for sealing the ends of the tubules therein in order to prevent the escape of any contained liquid therefrom.

6. An apparatus for producing self-sustaining tubulous masses from plastic material, comprising a chamber, a plurality of tubular members, in spaced relation to each other, positioned in said chamber and extending substantially therethrough, said tubular members being supported at one end by a terminal disk which serves to close one end of said chamber and the opposite ends of said tubular members being substantially out of contact with each other whereby the plastic mass issuing from said chamber is not substantially disrupted and said chamber being substantially closed at one end and open at the other and having an inlet for material to be converted into tubulous masses, means to force fluid through said members into the tubules formed in said material by said members, and means for dividing the plastic mass issuing from said forming chamber into small unit masses and for sealing the ends of the tubules therein in order to prevent the escape of any contained liquid therefrom.

7. An apparatus for producing tubulous masses, in which material in plastic form is forced through a passage, around the exterior surface of a plurality of comparatively small, substantially parallel members located in spaced relation to each other within said passage, said material filling the space between said members during its movement through the passage and being rendered tubulous by said members, said spaced members being carried at their upper ends by a plate extending across said passage and closing the same, and are held in properly spaced relation adjacent their lower ends by a plurality of rods or wires carried by a ring also located in said passage, the plastic material being introduced into the passage between said plate and ring and being forced downwardly past said rods or wires and around the lower ends of the members or tubes, and the upper ends of the latter preferably communicating with a chamber containing liquid or other material to be introduced into the tubules formed in the plastic material.

8. An apparatus for producing units from a mass of material comprising a conveyer for such material, means to deliver said material to said conveyer, means spaced above the conveyer to maintain the mass thereon, spaced blades carried by the conveyer and movable transversely thereof to sever material in spaced relation on the conveyer, means to operate the conveyer and means to cause advance of the blades into the material on the conveyer and the retraction of the blades from the material on the conveyer during the operation of the latter.

9. An apparatus for producing units from a mass of material comprising a conveyer for such material, means to deliver said material to said conveyer, a belt spaced above said conveyer to oppose material thereon, means to operate said conveyer, a belt spaced above the conveyer movable in the same direction at substantially corresponding speeds, spaced blades carried by the conveyer and movable transversely thereof toward said belt to sever material in spaced relation on the conveyer, means to cause the advance of the blades into the material on the conveyer and the retraction of the blades from the material on the conveyer during the operation of the latter.

10. An apparatus for producing units from a mass of material comprising a conveyer for such material, means to deliver said material to said conveyer, a belt spaced above said conveyer to oppose material thereon, belts spaced above said conveyer and on opposite sides of the first named belt, means to operate said conveyer and belts in the same direction at substantially corresponding speeds, spaced blades carried by the conveyer and movable transversely thereof toward said belt to sever material in spaced relation on the conveyer, means to cause the advance of the blades into the material on the conveyer and the retraction of the blades from the material on the conveyer during the operation of the latter.

11. An apparatus for producing units from a mass of material comprising a conveyer for such material, means to deliver said material to said conveyer, means spaced above the conveyer to maintain the mass thereon, spaced blades carried by the conveyer and movable transversely thereof to sever material in spaced relation on the conveyer, means to operate the conveyer, means coöperative with said blades to advance them from the conveyer through the material thereon, means spaced from the last named means to retract the blades from said material, and means to maintain said blades advanced within the material on the conveyer between the means for advancing and retracting said blades.

12. An apparatus for producing units from a mass of material comprising a conveyer for such material, means to deliver said material to said conveyer, means spaced above the conveyer to maintain the mass thereon, spaced blades carried by the conveyer and movable transversely thereof to sever material in spaced relation on the conveyer, guiding means upon the conveyer for said blades, said blades having projections, springs coöperative between said blades and conveyer for projecting said blades from the conveyer, and cam means at opposite ends of the conveyer coöperative with said projections to cause the advance and retraction of said blades relatively to the conveyer as the blades pass said cam means.

Signed at New York city, in the county of New York and State of New York, this 11th day of July, 1917.

JACOB SCHAUB.

Witnesses:
MARGARET A. HECK,
PAUL R. JAMES.